(12) United States Patent
Lulue et al.

(10) Patent No.: US 9,811,893 B2
(45) Date of Patent: Nov. 7, 2017

(54) COMPOSABLE SITUATIONAL AWARENESS VISUALIZATION SYSTEM

(71) Applicants: Daniel L. Lulue, San Diego, CA (US); Deborah Gill-Hesselgrave, San Diego, CA (US); John Kammerer, San Diego, CA (US); Neil Acantilado, San Diego, CA (US)

(72) Inventors: Daniel L. Lulue, San Diego, CA (US); Deborah Gill-Hesselgrave, San Diego, CA (US); John Kammerer, San Diego, CA (US); Neil Acantilado, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 420 days.

(21) Appl. No.: 13/766,480

(22) Filed: Feb. 13, 2013

(65) Prior Publication Data

US 2013/0208001 A1 Aug. 15, 2013

Related U.S. Application Data

(63) Continuation-in-part of application No. 12/264,296, filed on Nov. 4, 2008, now abandoned.

(51) Int. Cl.
*G06T 5/50* (2006.01)
*G06F 17/30* (2006.01)
(Continued)

(52) U.S. Cl.
CPC .......... *G06T 5/50* (2013.01); *G06F 17/30241* (2013.01); *H04W 4/02* (2013.01); *H04W 4/18* (2013.01); *G08B 27/001* (2013.01)

(58) Field of Classification Search
CPC .... G06F 17/30; G06F 17/30241; H04W 4/02; H04W 4/18; G06T 15/00; G06T 5/50; G08B 27/001
(Continued)

(56) References Cited

U.S. PATENT DOCUMENTS 4,587,612 A 5/1986 Fisk et al.
6,215,498 B1 4/2001 Filo et al.
(Continued)

*Primary Examiner* — Gregory J Tryder
*Assistant Examiner* — Michael Le
(74) *Attorney, Agent, or Firm* — SSC Pacific Patent Office; Arthur K. Samora; Kyle Eppele

(57) ABSTRACT

A system and methods for maintaining situation awareness about an event are disclosed. The methods includes displaying said the location of the event on a digital reference map that is representative of a geographic area. As amplifying information pertaining to the event is received, the information is displayed at the same pixel location of the digital reference map as the event location to fuse geo-visualization and situation awareness of an event at the same display. Amplifying information can include remote updates from emergency personnel responding to said. A plurality of digital reference maps, corresponding to geographic areas for respective users, can be networked. The result is a network wherein a plurality of corresponding user have real-time situational awareness of critical events within the aggregate geographical area represented by the digital reference maps.

1 Claim, 7 Drawing Sheets

(51) Int. Cl.
  *H04W 4/18*    (2009.01)
  *H04W 4/02*    (2009.01)
  *G08B 27/00*   (2006.01)

(58) Field of Classification Search
  USPC ................ 345/419, 629, 632, 650, 619, 676
  See application file for complete search history.

(56) References Cited

U.S. PATENT DOCUMENTS

| | | |
|---|---|---|
| 6,392,661 B1 | 5/2002 | Tankersley |
| 6,970,884 B2 | 11/2005 | Aggarwal |
| 7,032,006 B2 | 4/2006 | Zhuk |
| 7,079,946 B2 | 7/2006 | Hunzinger |
| 7,136,059 B2 | 11/2006 | Kraus et al. |
| 2002/0196248 A1* | 12/2002 | Kraus et al. .................. 345/419 |
| 2004/0109012 A1 | 6/2004 | Kraus et al. |
| 2006/0211404 A1* | 9/2006 | Cromp et al. ................ 455/405 |
| 2007/0047702 A1* | 3/2007 | Newell et al. ........... 379/101.01 |
| 2007/0124292 A1 | 5/2007 | Kirshenbaum et al. |
| 2008/0052142 A1* | 2/2008 | Bailey et al. ..................... 705/8 |
| 2009/0100165 A1* | 4/2009 | Wesley et al. ................ 709/223 |

\* cited by examiner

COMPOSABLE SITUATIONAL AWARENESS VISUALIZATION SYSTEM

CROSS-REFERENCE TO RELATED APPLICATIONS

This application is a continuation-in-part of U.S. application Ser. No. 12/264,296, filed Nov. 4, 2008 (NC 098581), entitled "Composable Situational Awareness Visualization System". The '296 application is hereby incorporated by reference herein in its entirety.

FEDERALLY-SPONSORED RESEARCH AND DEVELOPMENT

This invention (Navy Case No. 98,581) was developed with funds from the United States Department of the Navy. Licensing inquiries may be directed to Office of Research and Technical Applications, Space and Naval Warfare Systems Center, San Diego, Code 2112, San Diego, Calif., 92152; telephone (619) 553-2778; email: T2@spawar.navy.mil.

FIELD OF THE INVENTION

The present inventive subject matter relates generally to digital data exchange over a data link.

BACKGROUND OF THE INVENTION

Current geo-visualization applications support disciplines like cartography and tasks that include monitoring of radar and GPS contacts, and force locations and movement. Some applications provide users with the ability to perform simple aggregation of disparate data events as map events. Most mapping tools further support the creation, addition, and removal of special purpose geographic layers and data overlays; some mapping tools even provide two-dimensional and three-dimensional visualization of natural and man-made features. All of these capabilities and features of current map-based products support the creation of visually spectacular views. However, the views often are not easily correlated to real-world tasks and workplace requirements. Thus, current geo-visualization tools do not specifically support situational awareness (SA).

Current SA software tools tend to be stand-alone, "stove-piped" legacy applications that provide only narrow SA visualization capabilities to the user. Also, there is often a large degree of functional overlapping among these applications, which requires users to recognize and eliminate duplicative or redundant information. Consequently, the data-collection capabilities of these applications tend to be both labor and training intensive. Additional disadvantages to existing SA methods and systems are the lack of timeliness of the information (due to the labor required to discover, collect, review, and disseminate the information), low levels of accuracy and consistency of information (due to the manual nature of reviewing the available data sources and correctly summarizing the data into information or knowledge units), and lack of relevance to consumers of the information (due to limited understanding of the context in which the information or knowledge units were developed). Also, current SA tools do not specifically support geo-visualization.

The Department of Defense in particular has a requirement for Command, Control, Communications, Computers, and Intelligence ("C4I") that is collaborative, dispersed, interactive, and real-time. Current C4I takes place in command post locations using maps, overlays and networked computers. These locations are fixed sites that require commanders to travel between command locations to ensure that every unit under the command shares a common vision of the situation under consideration. There exists a need for a C4I system which eliminates the delay caused by this travel. As will become apparent upon reading the detailed description herein, he present inventive subject matter relies on topics of digital mapping and image registration, which are fused with visual display of data link communication.

None of the prior art references address a situation wherein a visual status of an event whose image is acquired by a Command and Control (C&C) unit is automatically updated in real time in all the C&C units which are connected to the first C&C unit. Such updated information would be useful to all the C&C units in obtaining and maintaining a current, real-time SA of the situation; the information would be helpful in deciding whether to deploy and/or reassign vehicles under C&C unit control, as the SA for the event warrants.

As an example, consider a fleet of aircraft carriers wherein each ship controls its own squadron of aircraft. Each aircraft carrier is an autonomous command and control unit with respect to its own aircraft. Also assume that some of the ships collectively supervise the same geographical terrain territory, thus they use maps or aerial photographs in which the same significant events may appear. Assume also that whenever an aircraft under the C&C of one of the ships engages a specific target, the aircraft also transmits back to its ship (and only its ships) images of scenes, which include the engaged target. In such a case it would be beneficial that the rest of the aircraft carriers to be aware of the change of the status of the engaged target and thus avoid assigning duplicate aircraft assets to engage the same target.

In the past, operators of the individual control units were able upon listening to verbal communication to mark by hand or electronically, (e.g. by using a mouse) events on maps or aerial photographs. With the advent of "speechless" digital data link communications between control units, the operator of a control unit no longer receives the necessary information permitting him to be aware of changes in status of events which are reported by other control units. Furthermore even if the operator could access this vast quantity of verbal information, the operator would not be able to effectively handle the information.

SUMMARY OF THE INVENTION

Among other things, the present inventive system and methods have the capability to create collections of data, information, and knowledge and to share collections within and between levels of users within and across various geographies. The system and methods of the present invention: fuse generally available information sources into knowledge units in a geographic context; visualize the knowledge units across a variety of geographic levels; compose the knowledge units across different geographic levels; provide users with geo-spatial cross references to the knowledge units through texts; temporal, and geographic cues; and allow users to make map-based queries.

An embodiment of the inventive system and methods maintains up-to-date situation awareness (SA) about an event or series of events. To do this, a digital map, which represents a geographic area, is accessed. The location where an event or series of events is displayed on the map. As amplifying information that pertains to the event or series of events is received, that information is displayed at the map at the same pixel location on the digital map as the location where the event is occurring. Thus, the digital reference map is updated so that the amplifying information and the event are co-located on the display.

The amplifying of information that is displayed can include the identification of the responders, the responders' understanding of the mission and the current plan, and response progress and completion time estimates pertaining to the event.

A plurality of geographic areas can be assigned to a corresponding plurality of corresponding users. The user could receive and display amplifying information remotely, as described above. If the digital maps for each user are networked, the result is that the amplifying information for each event is available in real time to all users once it is displayed at a particular users digital reference map.

Another embodiment of the inventive system is configured to provide timely announcements and updates of critical events and critical data elements of such critical events to remote users, update and report on event status and evolution, maintain event SA, and respond to event requests for updates with timely and accurate information. In particular, this embodiment is configured to facilitate review the event critical data elements by the user, to determine if notification is required. The system logs receipt of the event, notifies all responsible parties about the event, visualizes the event's location and automates portions of the notification process and monitors progress and status.

The system can provide a log-view showing the history of received events. Specifically, the log-view shows the data elements of a log, or chronological record of critical data elements and sub elements pertaining to the critical event that has been entered into the digital reference map. The properties and values of each log record are shown in this view. The log-view can be used in conjunction with other views to effectively examine log interactions, and the log-view can further be manipulated to classify data elements base on the type of critical event. The analysis results of one or more log records are also shown in this view. For database applications, drilldown capabilities are optionally used in the inventive system. To drill down through a database is to access information by starting with a general category and moving through the hierarchy of critical data element fields to a desired sub data element. Also, the system has filtering capabilities, which allow a user to eliminate features of a particular scene so that other features are more readily viewed Stated differently, the system has the capability to "map de-clutter", so that only objects on the map that are relevant to the event or task of interest stand out.

Additional features of the inventive subject matter include the use of drag and drop functionality to display the critical data elements. "Drag and drop" is the action of (or support for the action of) clicking on a virtual event on a digital reference map and dragging it to a different location or onto another virtual event. In general, it can be used to invoke many kinds of actions, or create various types of associations between two abstract events. The drag and drop feature can be used to implement the ability to interact with a knowledge unit and to enhance the ability to visualize knowledge units within a geographical context, as opposed to the usual textual context; in sum, the drag and drop feature enhances the user's supervisory control ability, or the ability to monitor automated processes within a composable SA visualization context.

The present inventive subject matter includes a system and method for sharing, between a plurality of interconnected command and control units, visually rendered situational information in regard to events under military and civilian surveillance, wherein the information is transferred in real time by a digital data-link communication.

According to the present inventive subject matter there is provided a method for sharing visual situational information of events that includes providing from a remote location a mechanism for storing a digital reference map of a geographical area; receiving an image of a scene, which includes at least one event located within the geographical area; requesting the received image of the scene to the digital reference map; updating a situational information of the at least one event in the digital reference map according to the received image of the scene and, transferring the updating of the situational information of the at least one event to at least a second remote location.

An inventive method of the system also includes distributing messages. The method includes the steps of using a plurality of messaging systems to generate a message, associating a classification and a response time limit with the message to form a message package and forwarding the message package to at least one remote user. Finally, once the message is forwarded, an electronic controller begins and maintains a countdown by which message recipients must respond. Optionally, reminders can be sent to recipients. The message package can include a map containing latitude and longitude information. Alternatively, each of the control units can be reached by a telephone call tree, which is messaging system designed to deliver information to any size group automatically.

Other events and goals of the present inventive subject matter will become apparent upon reading the following description in conjunction with the following figures.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

The present embodiments herein are not intended to be exhaustive and to limit in any way the scope of the inventive subject matter; rather they are used as examples for the clarification of the inventive subject matter and for enabling of other skilled in the art to utilize its teaching. The word "exemplary" is used herein to mean "serving as an example, instance, or illustration." Any embodiment described herein as "exemplary" is not necessarily to be construed as preferred or advantageous over other embodiments.

The present subject matter is directed to a method of maintaining situational awareness about an event. The purpose of the present inventive subject matter is to update automatically and in real time digital data regarding the status of the event. The data is shared by a plurality of interconnected C&C units. The image that is representative of the event was acquired by a remote sensor controlled by one of the C&C units.

Figure 1:
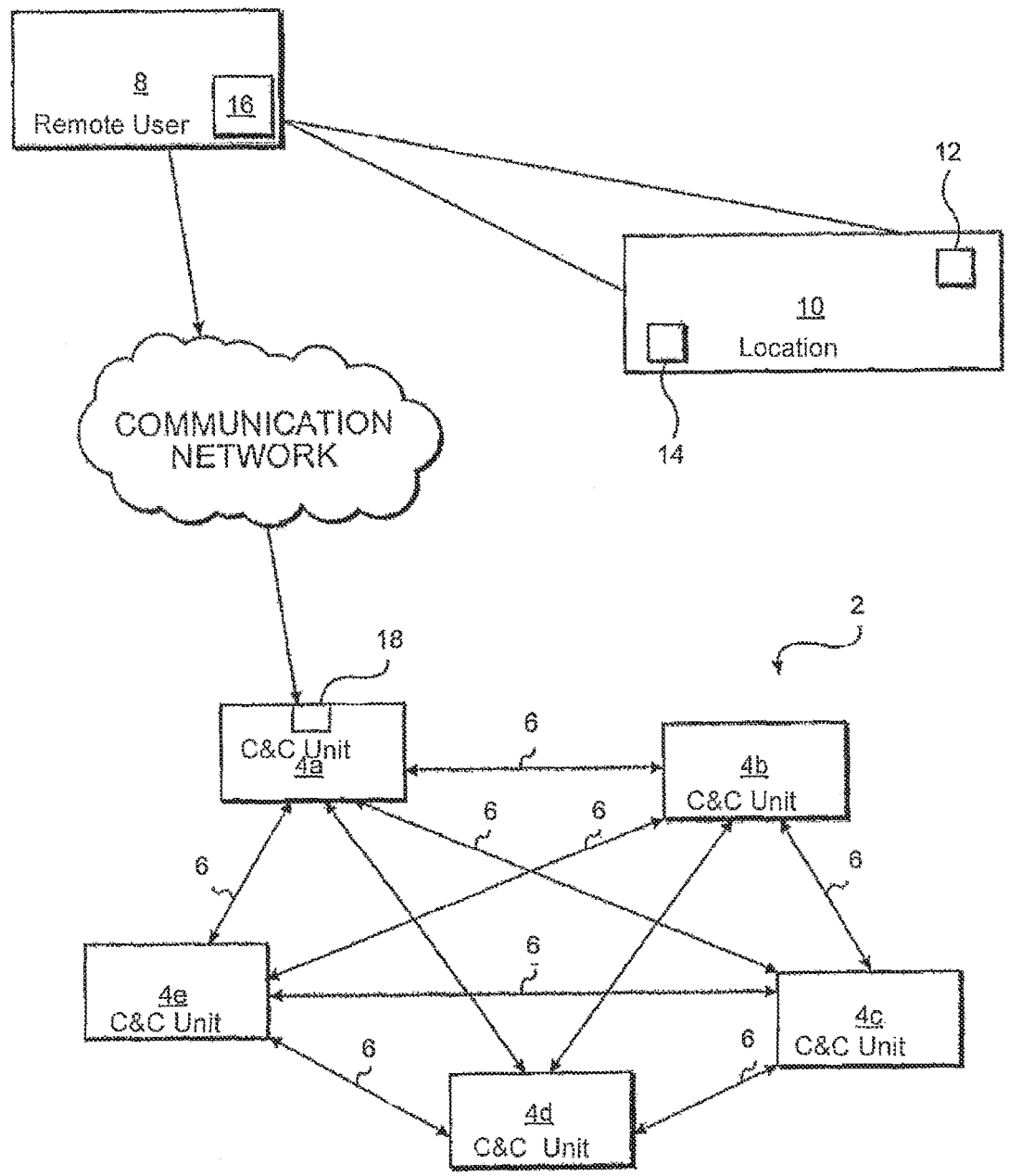
FIG. 1 shows elements in a command and control system according to the present inventive subject matter.

Referring now to FIG. 1, FIG. 1 shows a plurality 2 of C&C units, of which C&C units 4a-4e are representative, interconnected to each other in such a way as to enable two-way digital data links 6 between each C&C unit 4 of the group and the rest of the C&C 4 units of the group. The interconnection can be carried out by any networking known in the art (e.g. using electrical wiring, optical fibers, or via wireless communication).

Each C&C unit 4 in group 2 is responsible for monitoring a given geographical area (not shown) and is in charge of the surveillance of that geographical area, as well as the observation and reporting of significant events in that area. A remote user 8 acquires images of a significant event that is occurring at location 10, which is located in the geographical area assigned to at least one of C&C units 4a—4e, and which includes events 12 and 14. In FIG. 1, C&C unit 4a is responsible for the geographic area including location 10. If possible (but not depicted in FIG. 1), one of C&C units 4a—4e also captures images of the location 10 directly. The digital reference map is constantly displayed and updated on a suitable display device in both the remote user's location and in at least one of the C&C units.

Remote user 8 carries on board a transmitting device 16, which transmits data wirelessly, via an optical fiber, or by other communications networks known in the art (such as the internet, for example) an image of scene 10 to an image receiving device 18 located in C&C units 4a. Image receiving device 18 reconstructs a digital image of scene 10, which includes events 12 and 14 in an addressable memory location of a computer 20 or similar type of processor (shown in FIG. 2, where C&C unit 4 is depicted in greater detail) of at least one of C&C units 4a-4e. In addition, a received digital image of event 12 or 14 is visually displayed on a digital reference map located at C&C unit 4a.

C&C unit 4a, transmits data from its digital reference map to each remaining C&C unit 4b-4e of group 2 via data link 6. The remaining units 4b-4e each store in the database of its computer a digital image of the scene 10, which unit 4a supervises; the digital image can include images of events (e.g. events 12 and 14) that can be affected by means that are controlled by that C&C unit. To do this, the reference digital maps of individual C&C units do not have to be identical, or overlap completely; they should, however, share a common region that includes location 10, where events 12 and 14 are occurring. With this configuration, when an event occurs, or amplifying information for an event becomes available, and necessitates a map's updating, all maps that depict at least a portion of that event or are otherwise affected thereby can be updated via data link 6.

To register an image of events 12, 14, the locations of an event 12 or 14 can be assigned to corresponding pixel locations in a digital reference map of at least one of C&C units 4a-4e, (its exact geographical location can be determined too) according to the event's appearance in an image of location 10, acquired by imaging device 16 at the location of the remote user 8. Such an image, which is included in at least one video frame or at least one still picture, can be transmitted in real time to at least one, or all of, C&C units 4a-4e.

One desired output of the image registration process is a useful representation of the correspondence between overlapping sets of images; usually a mapping function, which in the present inventive subject matter transforms the spatial coordinates set of the perspective view image into the corresponding spatial coordinates set of the reference digital map. Thus, the pixels in the digital reference map that correspond to the location of the event on the digital reference map can be identified and manipulated as more fully described below.

While the digital reference map is usually based on a visible optical imagery of the area under surveillance, it should be appreciate that the images of events acquired by the remote user 8 and transmitted to C&C unite 4a may include infrared images, thermal images, multi-spectral images, ladar (laser radar) images, radar images and images which are based on the output of chemical and biological sensors.

After image registration, an operator of at least one of the C&C units 4a-4e electronically updates the digital reference map of his C&C unit so as to take into account the observed changes in the situational information of the events. A change in the situational information of an event is any amplifying information pertaining to any change in the event's geographical location, or any change in the event's physical or chemical state; (e.g. a vehicle has been removed, a target has appeared or alternatively has been destroyed, a residential area that has been affected by chemical warfare, or a news report that updates a national disaster such as a hurricane has been broadcasted).

"Electronic updating" refers to any indication with regard to the pixel map of the event in the digital reference map that differentiates the event's symbolization in the digital reference map after the updating, as compared to its symbolization before the updating. For example in the digital reference map, electronic updating includes marking the image of the event or its location, changing the event's image size, color, contrast and even the total elimination of the event image from the reference digital map. Such an electronic updating, which is practically carried out by manipulating the image of the event or its location in the visual display of the digital reference map, can be coded and should have a common meaning to the operators of all C&C units. The updated digital reference map is then either stored in the database of C&C unit 4a as a second layer on top of the original digital reference map, or replaces the original digital reference map in the database of C&C unit 4a.

The present inventive subject matter also includes an automatic visual updating of a representation of an event or its location in a digital reference map of at least one C&C unit (for example, C&C unit 4a) according to data provided via data-link to another C&C unit (for example, by C&C unit 4b). This is to say, once the system of a "master" C&C unit (i.e. the unit which receives perspective view images of a given event such as event 12) updates electronically its digital reference map, the digital reference map of the other C&C units which are interconnected by a computer network to the master C&C unit, are updated as well in regard to the situational awareness of common events which appear on respective digital reference maps.

Another embodiment of the inventive system is configured to provide timely announcements and updates of critical events and related information to remote users, update and report on event status, maintain event SA, and respond to C&C unit requests for updates with timely and accurate information. In particular, this embodiment is configured to review the event to determine if notification is required. The system logs receipt of the event and notifies all responsible parties about the event.

The system can provide a log-view showing the history of received events. Specifically, the log-view shows the data elements of an imported log, or chronological record of amplifying information, such as critical data elements of data sub-elements pertaining to the critical event, that has been entered into the digital reference map at the same location as the event. The properties and values of each log record are shown in this view. The log-view can be used in conjunction with other views to effectively examine log interactions, and the log-view can further be manipulated to classify data elements base on the type of critical event. The analysis results of one or more log records are also shown in this view. For database applications, drilldown capabilities are optionally used in the inventive system. To drill down through a database is to access information by starting with a general category and moving through the hierarchy of critical data element fields to find a desired data sub element. Also, the system has filtering capabilities, which allow a user to eliminate features of a particular scene so that other features are more readily viewed.

A further embodiment of the inventive system is configured to enable a regional operations center (ROC), Operations Command-and-Control (C&C) and other departmental staff to be aware of key messages without having to personally review the entire daily message stream, enable staff to access key messages with minimal effort, determine which messages are "key" and publish them to a Key Messages view so they are immediately visible throughout the domain, employ key messages to help support ongoing up-to-date situation awareness, and monitor key message response time requirements and respond within the time limits. To do this, each message has an associated priority based on its type. Some messages have to be responded to within five minutes; other must be responded to within fifteen minutes. These exemplary rules can be predetermined via a computer readable means in a manner known in the art and then input into the system to flash a remind at the user when a message's response time limit has expired. The inventive system is capable of previewing message traffic collected over a previous shift, notifying others about or responding to a key message within a predetermined time limit, and visualizing locations contained within a message on a map and associating a date/time value with the plotted message.

Figure 2:
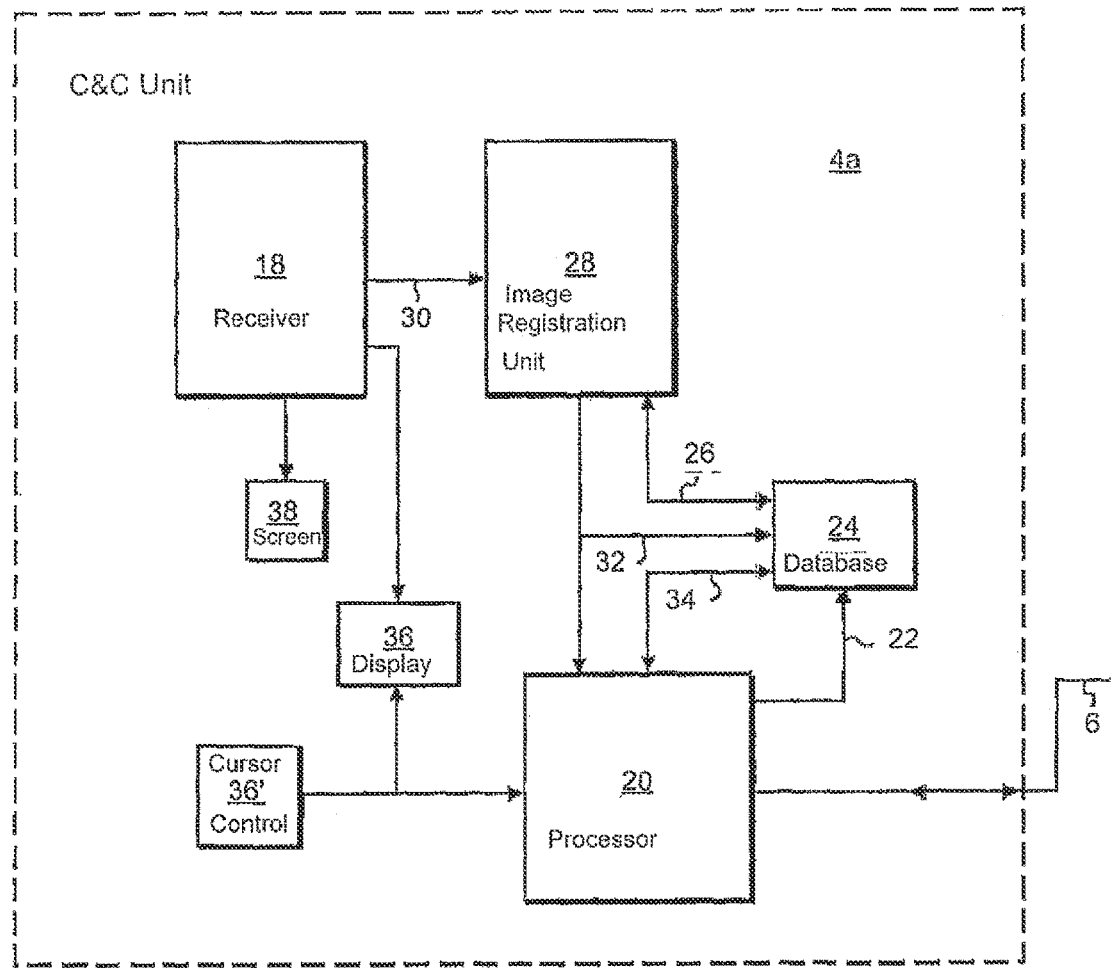
FIG. 2 shows operational interrelations between elements of a command and control unit of the command and control system shown in FIG. 1.

Referring now to FIG. 2, a block diagram, which depicts components and their interrelations in a representative C&C unit 4, such as C&C unit 4a, is shown. In FIG. 2, C&C unit 4a includes a receiving device 18, which receives in real-time images of events 12 and 14 from location 10 that were acquired by an imaging device (not shown). Events 12 and 14 from location 10, which are being watched, are selected by a human operator (not shown) of C&C unit 4a.

A processor 20 (e.g. a central computer with the appropriate software) reports (arrow 22) to a database 24 information that pertains to location 10 (e.g. its geographical boundaries). An appropriate stored digital reference map, which includes location 10 (and imaged events 12 and 14) is extracted from database 24 and sent (arrow 26) to image registration unit 28. Image registration unit 28 also accepts (arrow 30) from receiving device 18 real-time digital images of a perspective view of events 12 and 14 occurring at location 10.

As a result of the image registration, the pixel location corresponding to the location 10 for events 12 and 14 on the digital reference map becomes identified and is reported back (arrow 32) to database 24. Thus, in database 24, a new digital reference map is formed and includes updated two-dimensional symbolization of events 12 and 14 (at their appropriate coordinates). This new digital reference map is delivered (arrow 34) to processor 20, which displays the digital reference map on an appropriate display 36.

Simultaneously to all the events described above, while watching in real time the perspective view of imaged scene 10 appearing on monitor 38 or on screen 36 (together with the digital reference map), the operator of at least one of C&C units 4a-4e perceives constantly the situational information relevant to events 12 and 14. The operator may electronically mark the location or the image of events 12, 14 in the digital reference map appearing on screen 36, by using a cursor control device 36'.

The digital grid of the marked events 12, 14 is stored in database 24 as a second layer on top of the digital reference map. Simultaneously, the digital grid regarding marked events is transferred via a data-link 6 to all other network interconnected units (not shown) of C&C system 2, in which this situational information is incorporated (by units which are analogous to processor 20) into the digital reference map of imaged area 10, and stored in the respective databases of these units. At the same time, the information transferred by data link 6 is visually rendered by the receiving C&C units and displayed on the screens of the respective displays of these units in the same manner as described above for C&C Unit 4a.

The outcome of the present inventive subject matter is that users in all the network-interconnected C&C units see on their screens at the same time images of digital reference map which include updated symbolization (e.g., marking) of the same events, along with the amplifying information that pertains to those events. In this manner, geo-visualization can be fused with SA of an event can be distributed real-time to network C&C units 4.

A major distinguishing capability of the invention as described herein is the support it can provide for the principle of composability, which is used herein to mean a mechanism for creating new, more capable and complex things from multiple, simpler things. In the general computer science context "things" include concepts, abstracted physical objects, atomic operations, functions, software classes, and so on. In the invention's context, the composed "thing" is an information set that represents the cumulative and prevailing body of understanding about an environmental situation or event. The invention provides both implicit and explicit information aggregation capabilities to the System and the end-user through its business logic components and its User Interface (UI).

Information composition occurs on a regular basis in the invention according to several embodiment for the system 2. In tactical and emergency management situation, views are needed to explicitly support end-user (watch-stander) situational awareness (SA) and critical task lifecycle. The invention accomplishes this by aggregating information quanta into knowledge and understanding compositions. For example, when an environmental event occurs that triggers an emergency response, event information can flow to and from system 2 to a number of separate repositories, including:

a human dispatcher over voice, disparate databases over networks, watch-standers over radio and telephone voice, email and chat, a general audience, including dispatchers and watch-standers over media broadcasts.

Figure 5:
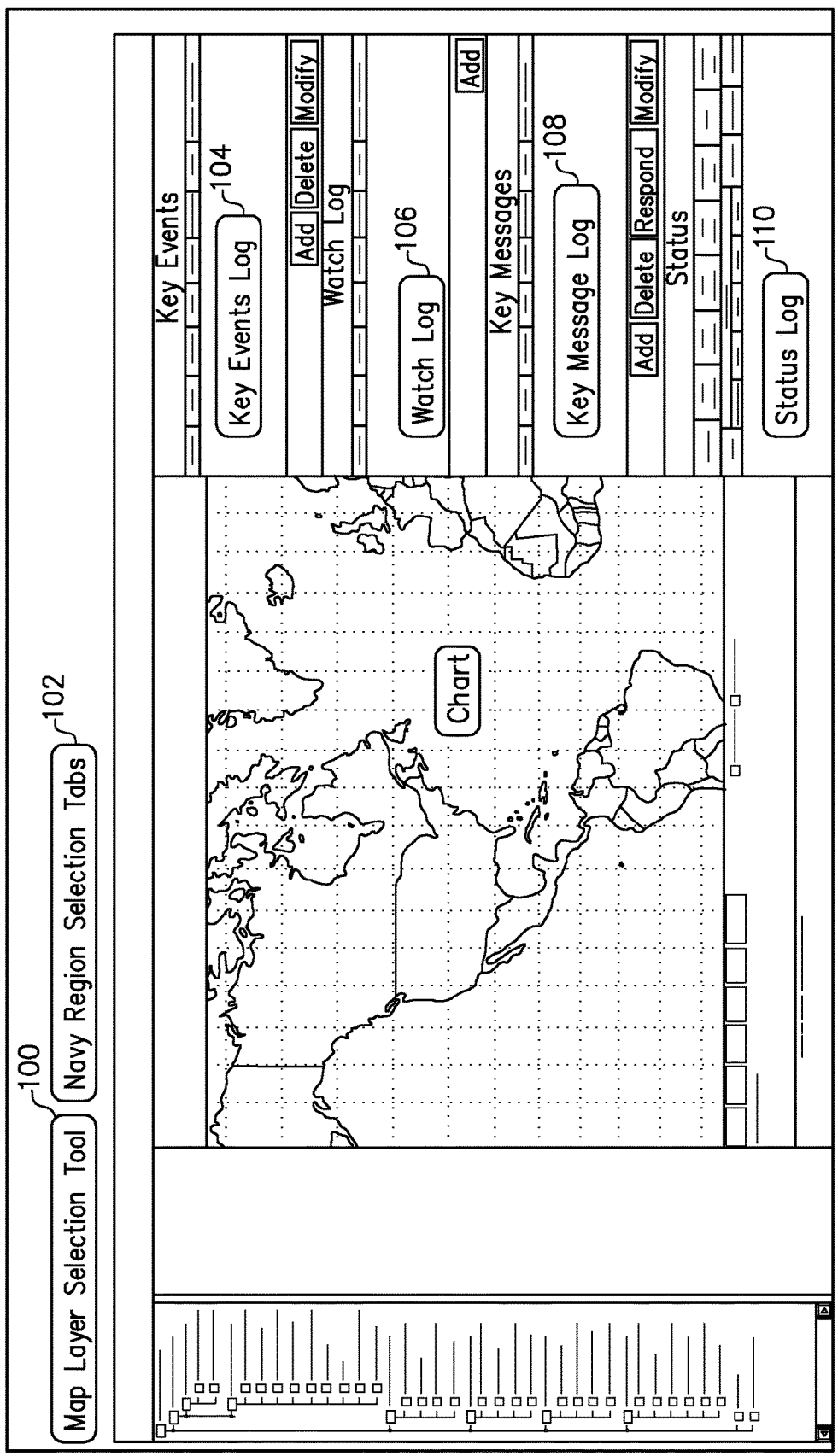
FIG. 5 is a screen shot the illustrates that illustrates the Key Events Log, Watch Log, Key Messages Log and Status Log selection tabs of the system of FIG. 1.
Figure 6:
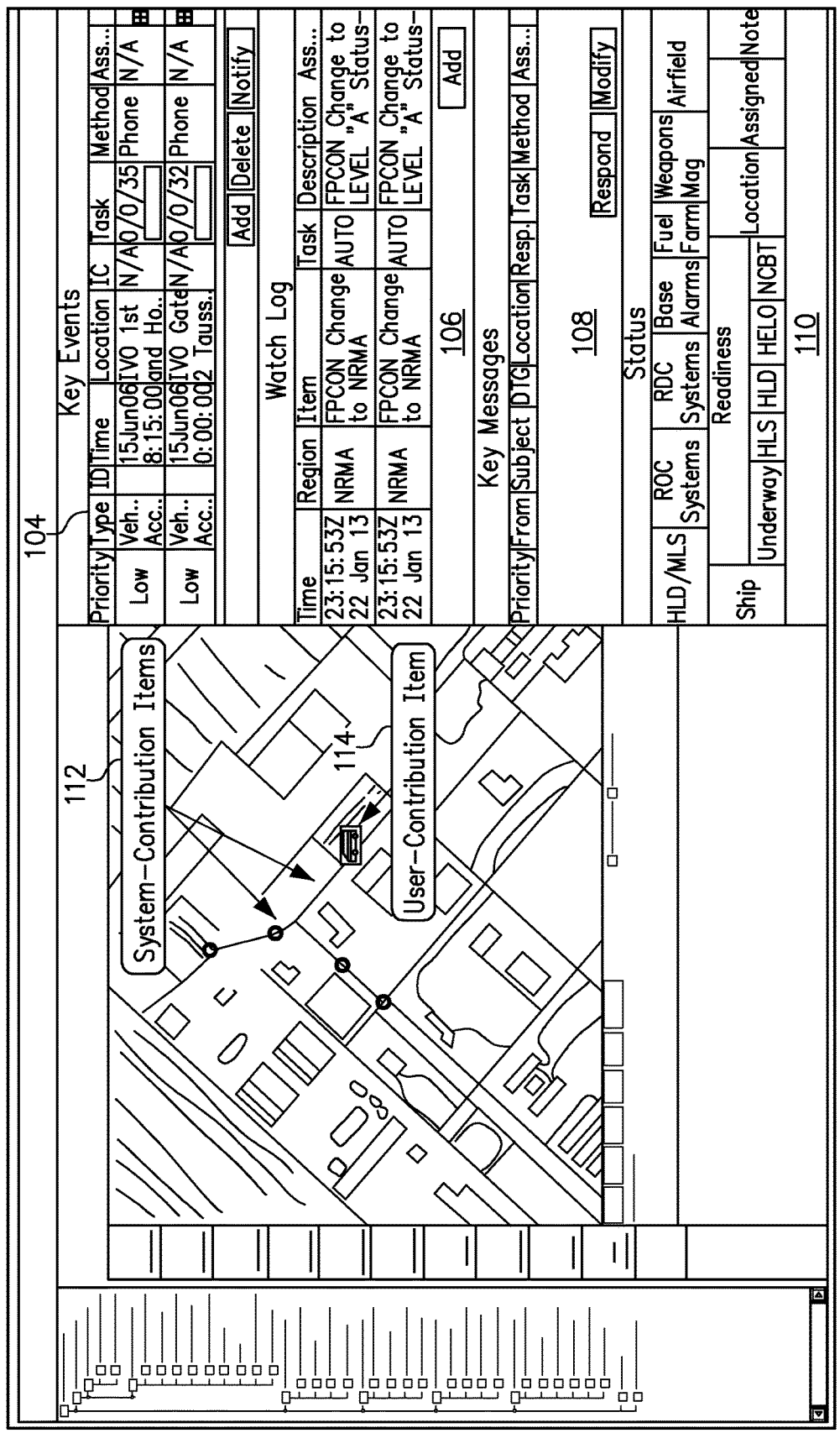
FIG. 6 is the same screen shot as FIG. 4, but during the actual operation of the command and control system of FIG. 1, and with a specific geographic location being shown; and, FIG. 7 is the same screen shot as FIG. 6 but with the Watch Log selection tab updated.
Figure 7:
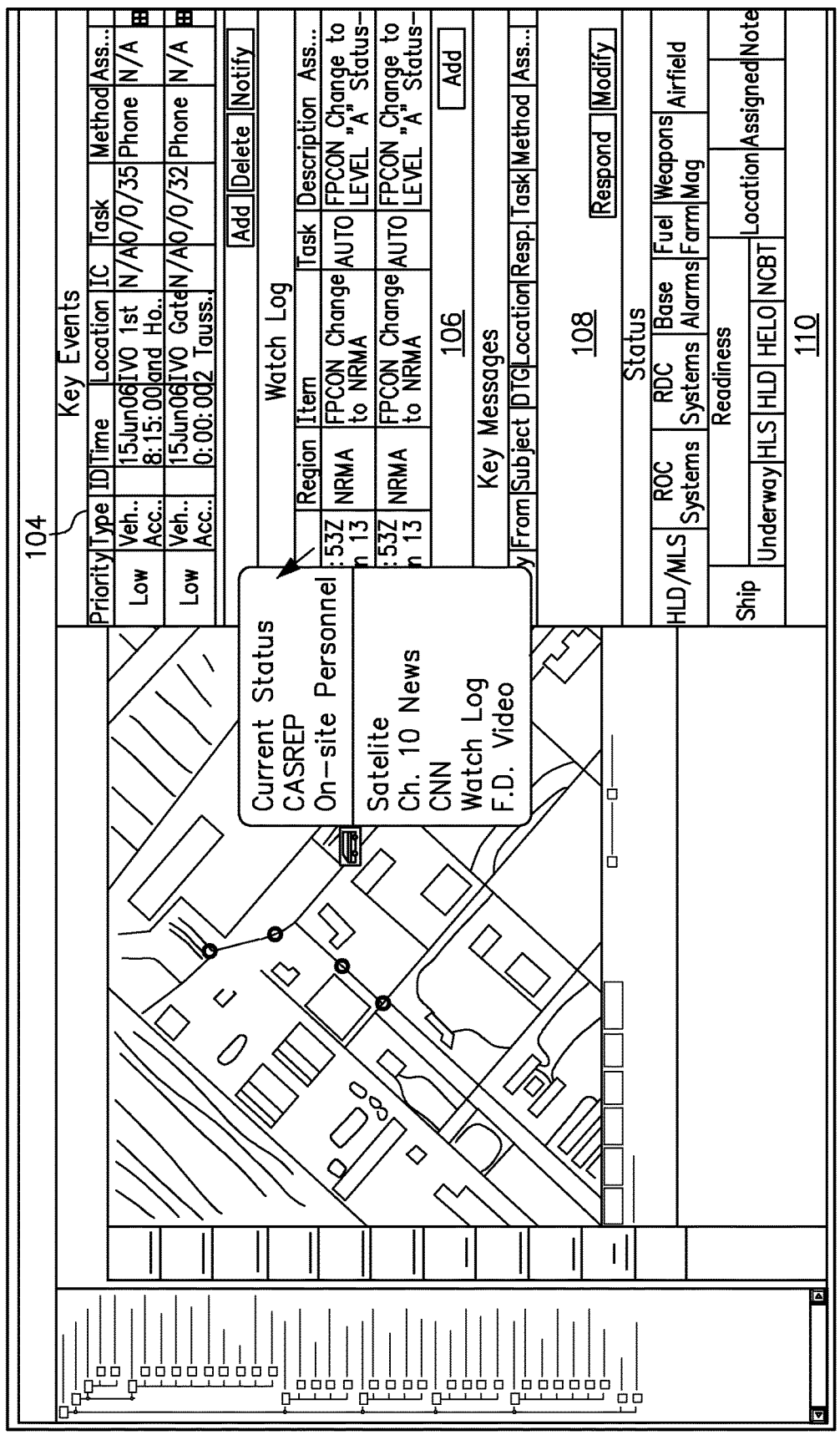

As shown in FIGS. 5-7, the invention according to several embodiments can compose diverse information pieces that are composed onto a view that includes a map layer selection tool 100, a row of selectable Navy Region selection tabs 102 that filter the map to the selected region, and four log panes: Key Events Log 104, Watch Log 106, Key Messages Log 108 and Status Log 110 (FIG. 5). In FIG. 5, view components can be strongly aggregated (composed) into the user interface by the system 2 at application startup. Weakly aggregated information items can include time-dependent information contributed to the user interface by the system 2 or the end user (the watchstander, not shown in the Figures) using drag-and-drop configuration for the log panes 104-110, as shown in FIG. 6. This type of information can become "stale" and can be removed by either the system or the user. In this context strongly aggregated (composed) items are those who absence from the Information Set would change its meaning, while weakly aggregated items are those that can be safely removed without impacting meaning, as shown by system contributed items tab 112 and user-contributed items 114 in FIG. 7.

In a military or civilian setting, one of the networked C&C units can be designated as a control station, and an event being conducted on a large geographic scale can be managed and closely monitored by a user located at the control station. The user at the control station is kept up-to-date of the progress and estimated completion times of remote users, who are inputting information pertaining to the event from remote locations, such as location 10. The inventive system can programmed with a goal and benchmarks (based on previously input historical data on similar event) with which to compare the progress of the remote project task accomplishment. Upon learning of that a benchmark is reached, the system can estimate the completion time of the entire project or particular aspects of the event based on a projected time to reach each bench mark.

Figure 3:
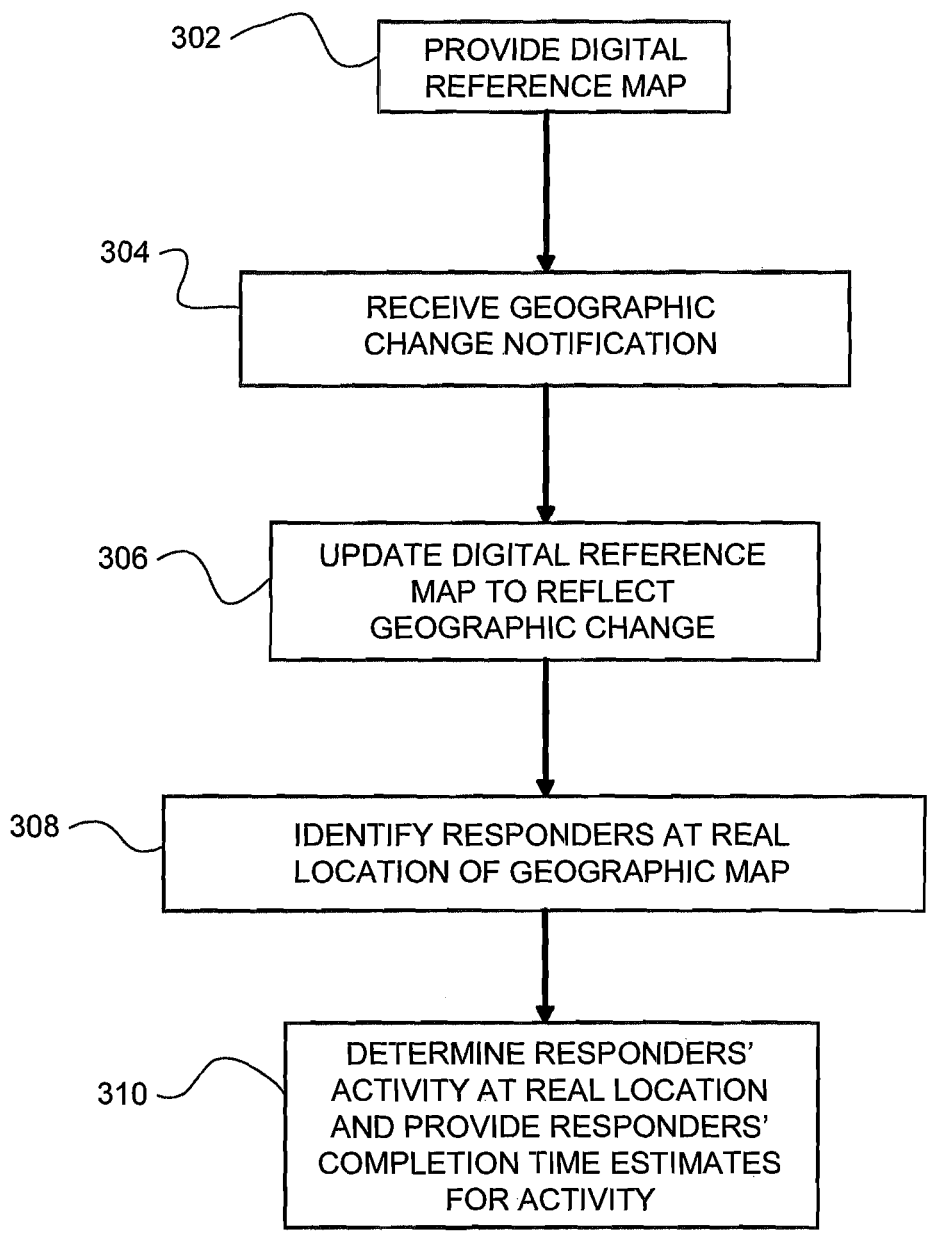
FIG. 3 shows a flow chart for a method of maintaining situational awareness about an event.

FIG. 3 shows a flow chart for a method of maintaining situational awareness about an event. At step 302, the system provides a digital reference map; at step 304 the system receives notification of a change in the status of an event at a particular location. At step 306, the system updates the digital reference map that was provided in step 302 to reflect the location where the event is occurring. At step 308, the system identifies amplifying information such as responders, who are people or groups of people at the real-life site that is being represented in the digital reference map of step 302. At step 310, the system determines whether the identified people at the real-life site are conducting any activity and, based either on communication with the people at the real-life site or based on interpolation done by the system which is based on previously input historical data from similar events), the system can provide completion time estimates for that activity. At this step, the system can confirm that the activity being conducted at the real-life site corresponds with instructions previously provided to the people at that real-life site. To confirm the activity, the system can maintain a listing of instructions that correspond to the instructions that were previously provided and the system can, after geography has been changed, request confirmation from the people at the real-life site that the instructions can still be carried out, thereby articulating the responders' understanding of the instructions.

Figure 4:
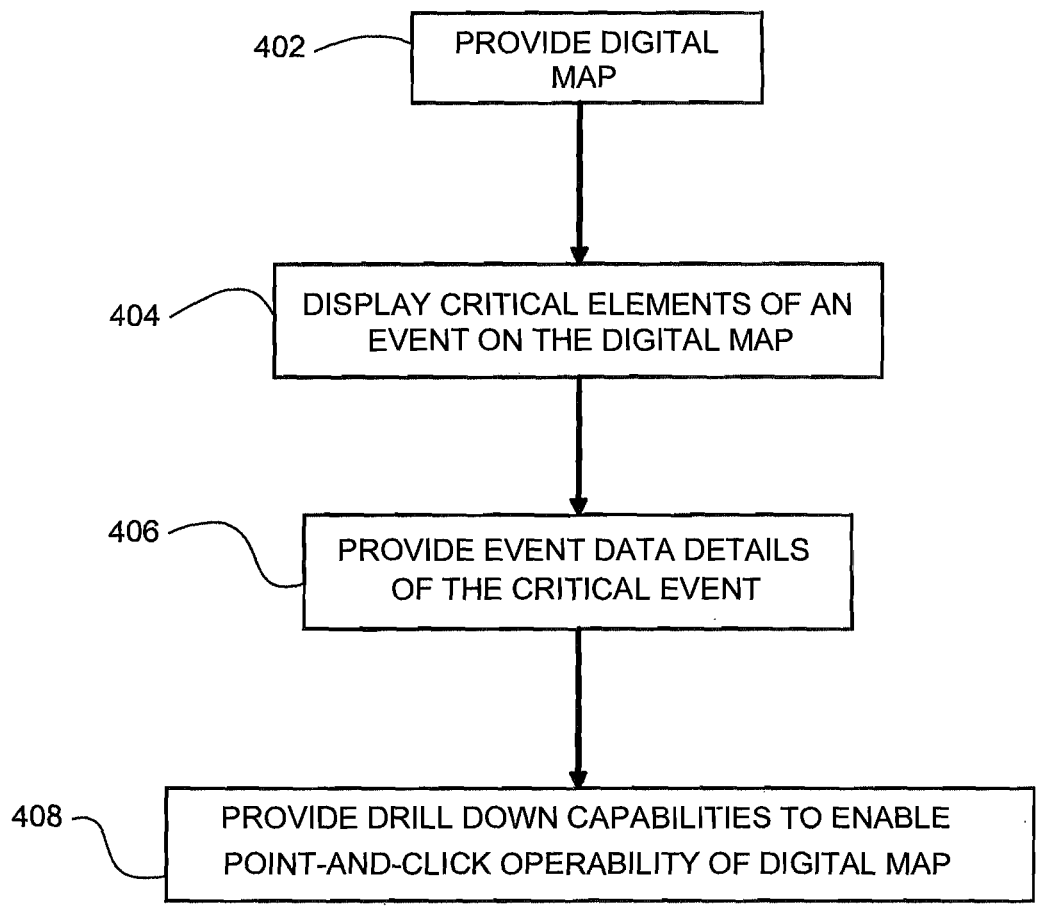
FIG. 4 shows a flow chart for a method of distributing information pertaining to a critical event of a project or operation.

FIG. 4 shows a flow chart for a method of providing announcements of a critical event of a project or operation. At step 402, the system provides a digital reference map. At step 404, the system displays critical elements of an event on the digital reference map, i.e., changes in geography, movements of personnel, etc. At step 406, the system provides the details of the critical elements of the event, as well as the data sub elements pertaining to the critical event. All of this information can be provided, as in step 408, in a point-and-click drill down fashion. More specifically, since the critical data elements and sub-elements are located at the same pixel location on the digital reference map as the event, all the user has to move a cursor over the pixel location. When this occurs, the critical data element can be displayed along with the event, and the user may readily obtain very detailed information pertaining to the event.

The previous description of the disclosed embodiments is provided to enable any person skilled in the art to make or use the present inventive subject matter. Various modifications to these embodiments will be readily apparent to those skilled in the art, and the generic principles defined herein may be applied to other embodiments without departing from the spirit or scope of the inventive subject matter. For example, one or more elements can be rearranged and/or combined, or additional elements may be added. Thus, the present inventive subject matter is not intended to be limited to the embodiments shown herein but is to be accorded the widest scope consistent with the principles and novel features disclosed herein. It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A method of distributing information pertaining to a critical event of a project or operation, said method comprising the steps of:

A) networking a plurality of Command and Control (C&C) units, each said C&C unit having a geographic area of responsibility (AOR), at least one receiving device, a database of digital maps that is representative of said AOR, an image registration unit connected to said database and said at least one receiving device, and a processor, said critical event within said AOR;

B) extracting a digital reference map corresponding to the location of said event from said database from one of said plurality of C&C units;

C) accepting said digital reference map at said image registration unit;

D) registering the pixel location of said critical event on a digital grid superimposed on said digital reference map at said image registration unit;

E) receiving said information from said receiving device, at said image registration unit;

F) displaying said information at said digital reference map at said pixel location, said step F) being accomplished at said image registration unit and resulting in an updated digital reference map;

G) said information including a message log for display at said pixel location;

H) transmitting said updated digital reference map and said message log from said image registration unit to said database for direct transmission via the network of said step A) to the remainder of said plurality of said C&C units when said pixel location is included within said AOR of said plurality of said C&C units.

* * * * *